F. W. KING.
SPECTACLES.
APPLICATION FILED NOV. 27, 1911.
1,017,766.
Patented Feb. 20, 1912.
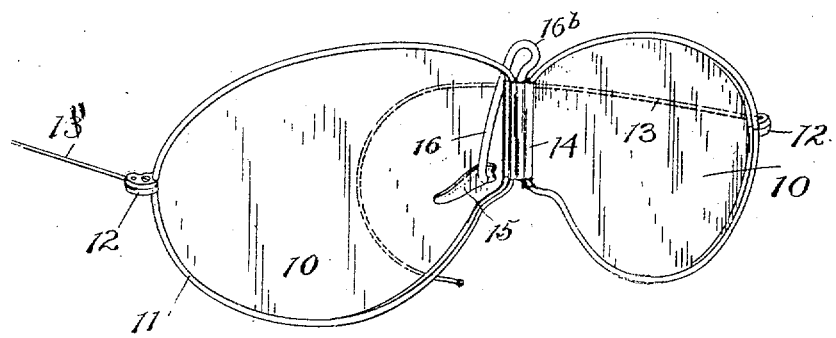
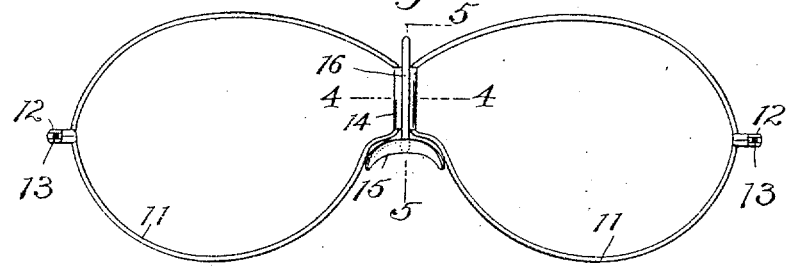
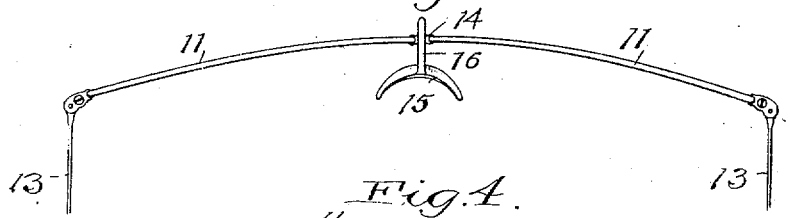
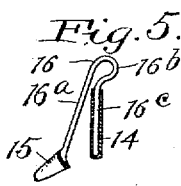
Witnesses.
E. B. Gilchrist
H. C. Sullivan
Inventor.
Frederick W. King
by Thurston & Kwis
Attys.

UNITED STATES PATENT OFFICE.

FREDERICK W. KING, OF CLEVELAND, OHIO.

SPECTACLES.

1,017,766. Specification of Letters Patent. Patented Feb. 20, 1912.

Application filed November 27, 1911. Serial No. 662,551.

*To all whom it may concern:*

Be it known that I, FREDERICK W. KING, a citizen of the United States, residing at Cleveland, in the county of Cuyahoga and State of Ohio, have invented a certain new and useful Improvement in Spectacles, of which the following is a full, clear, and exact description.

This invention relates to spectacles, especially adapted for shooters or others engaged in outdoor sports or work, and has for its main object the provision of glasses which will afford the requisite protection to the eyes of the wearer against wind, dust, smoke, and the like, which will be supported squarely and firmly on the nose, and is capable of an adjustment which enables the position of the lenses to be adjusted to the requirements of the wearer.

More specifically, the invention aims to provide a supporting post for the nose piece, which by its shape and flexibility will enable the nose piece to be raised and lowered or to be moved toward and away from the lenses so that the latter may be properly positioned relative to the eyes of the wearer, and which will not at any time interfere with the proper seating of the glasses on the nose nor be visible to the wearer.

These objects I accomplish principally by the novel shape and construction of the bridge or nose piece support, in combination with other features, as will appear in the following description, and my invention may be here briefly summarized as consisting in certain novel details of construction and combinations and arrangements of parts which are described in the specification and disclosed in the accompanying sheet of drawings, wherein—

Figure 1 is a perspective view of a pair of glasses adapted particularly for shooters' use, the glasses being equipped with my invention; Fig. 2 is a front view of the same; Fig. 3 is a top plan view of the same; Fig. 4 is an enlarged cross sectional view substantially along the line 4—4 of Fig. 2; and Fig. 5 is a vertical sectional view substantially along the line 5—5 of Fig. 2.

The glasses include lenses 10, which in this case are supported in eye wires 11, but I do not regard it as a matter of material importance whether the glasses are of the type here shown, or of the rimless type. The glasses are also provided with temple hinges 12, and with the temples 13. The shape of the lenses are substantially such as have been employed heretofore in shooters' glasses, and as in some prior constructions, the adjacent edges of the lenses are close together, so as to form substantially continuous protection to and about the eye, the word "continuous" being used in the sense that there is no open gap between the lenses. In the connecting means between the lenses, I employ two vertical strips 14, which in view of the fact that I employ the eye-wires 11, connect the lenses together, by being soldered to the eye wires. The connecting means holds the lenses in fixed relative positions and does not provide any relative swinging movement, such as is provided in those glasses wherein the lenses are connected by a hinging connection.

To hold the glasses firmly in position on the nose of the wearer, I employ an arched bridge or nose piece 15, and a supporting post 16 for this bridge piece. It is the particular shape and construction of this post which forms the principal part of my invention, for by reason of its form and construction, I am enabled to accomplish the above enumerated and other objects and obtain glasses having an adjustability which adapts them to the needs of any wearer. This nose piece support 16 is in the form of a wire which is sufficiently flexible for the purpose intended, and is secured at its lower end to the middle of the nose piece. From the nose piece, the wire extends upwardly and forwardly to a point well above the lens connecting means 14, this portion being preferably inclined upwardly and forwardly in a substantially straight line, as best indicated in Fig. 5. Thence the wire is curved in the form of a loop 16$^b$ which projects forwardly beyond the lens connecting means, and in fact beyond the planes of the lenses themselves. The lower portion of the loop, extends rearwardly or inwardly toward the wearer, and from this point, the wire extends vertically or downwardly, as shown at 16$^c$, this portion extending between the lens connecting strips 14, and being anchored to the same preferably by soldering.

By reason of the loop 16$^b$, the position of the bridge piece can be varied considerably by changing the shape of this loop or by altering its size. In other words, I provide excess stock material in this loop, which enables the bridge piece to be raised or lowered, or to be moved inwardly or outwardly with reference to the lenses. This is of considerable importance for the reason that a pair of glasses not having this adjustability are often very troublesome, because the glasses do not properly fit the wearer, or are so close to the eyes that the eyelashes of the wearer touch the lenses. This is annoying and often harmful, especially if the wearer is of nervous temperament. Furthermore, by extending the wire or post upwardly from the nose piece, above the lens connecting means, and thereby providing the forwardly projecting loop 16$^b$, and thence extending the wire downwardly between the adjacent edges of the lenses and into the lens connecting or holding means, the loop is well above the eyes and so located that it will not interfere with the proper seating of the glasses on the nose, nor can it be seen by the wearer. It is obvious that if this loop project forwardly, somewhat between or below the eyes, it would be a constant source of annoyance to the wearer, even if it would not actually obstruct his vision.

Having thus described my invention, what I claim is:

1. In a pair of spectacles, lenses having their inner edges adjacent each other, a connection between the lenses holding the latter in fixed relative positions, a nose piece and a post secured to the nose piece at its lower end, and extending upwardly therefrom above the connecting means between the lenses, and thence extending downwardly between the lenses in said connecting means.

2. In a pair of spectacles, lenses having their inner edges adjacent each other and connected together at their adjacent edges so as to be held in fixed relative positions, a nose piece, a post supporting the nose piece and extending forwardly and upwardly therefrom, and having a forwardly extending loop above the connecting means, and thence extending from the loop downwardly between the lenses, the downwardly extending portion being secured to the connecting means.

In testimony whereof, I hereunto affix my signature in the presence of two witnesses.

FREDERICK W. KING.

Witnesses:
H. R. SULLIVAN,
A. F. KWIS.